US008942833B2

(12) United States Patent
Nagasaka

(10) Patent No.: US 8,942,833 B2
(45) Date of Patent: Jan. 27, 2015

(54) DISPLAY DEVICE WITH STEPWISE DISPLAY SCALE CONTROL, STEPWISE CONTROL METHOD OF THE DISPLAY SCALE ON A DISPLAY DEVICE, AND COMPUTER PROGRAM FOR STEPWISE CONTROL OF THE DISPLAY SCALE OF A DISPLAY DEVICE

(75) Inventor: Hidenori Nagasaka, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 538 days.

(21) Appl. No.: 13/292,631

(22) Filed: Nov. 9, 2011

(65) Prior Publication Data

US 2012/0130510 A1 May 24, 2012

(30) Foreign Application Priority Data

Nov. 23, 2010 (JP) ................................ 2010-260707

(51) Int. Cl.
  *G06F 3/0485* (2013.01)
  *G01C 21/36* (2006.01)
(52) U.S. Cl.
  CPC .................................. *G01C 21/3664* (2013.01)
  USPC ............................................. 700/83; 345/660
(58) Field of Classification Search
  None
  See application file for complete search history.

(56) References Cited

U.S. PATENT DOCUMENTS

| | | | | |
|---|---|---|---|---|
| 7,542,054 | B2* | 6/2009 | Wang et al. ..................... | 345/660 |
| 2004/0075672 | A1* | 4/2004 | Vale et al. ...................... | 345/660 |
| 2004/0100479 | A1 | 5/2004 | Nakano et al. | |
| 2005/0083299 | A1* | 4/2005 | Nagasaka ...................... | 345/156 |
| 2005/0182604 | A1* | 8/2005 | Agrawala et al. ................. | 703/2 |
| 2008/0027637 | A1* | 1/2008 | Sakano ......................... | 701/209 |
| 2008/0094352 | A1* | 4/2008 | Tsuk et al. ..................... | 345/156 |
| 2008/0273018 | A1* | 11/2008 | Woolley et al. ................ | 345/173 |
| 2009/0091540 | A1* | 4/2009 | Doan et al. .................... | 345/173 |
| 2010/0034400 | A1* | 2/2010 | Aiso ............................. | 381/119 |
| 2010/0268448 | A1* | 10/2010 | Doan et al. .................... | 701/201 |
| 2011/0037727 | A1* | 2/2011 | Lee et al. ....................... | 345/174 |
| 2011/0037735 | A1* | 2/2011 | Land et al. ..................... | 345/178 |
| 2011/0242136 | A1* | 10/2011 | Yamada et al. ............... | 345/660 |

FOREIGN PATENT DOCUMENTS

| | | |
|---|---|---|
| EP | 1 677 182 A2 | 7/2006 |
| JP | A-2000-163031 | 6/2000 |
| JP | A-2002-328040 | 11/2002 |
| JP | A-2003-330613 | 11/2003 |
| JP | A-2004-151522 | 5/2004 |
| JP | A-2006-185275 | 7/2006 |
| JP | A-2009-205462 | 9/2009 |
| JP | A-2010-237902 | 10/2010 |

OTHER PUBLICATIONS

Oct. 7, 2014 Search Report and Written Opinion issued in European Patent Application No. 11 18 8482.

* cited by examiner

*Primary Examiner* — Ryan Jarrett
(74) *Attorney, Agent, or Firm* — Oliff PLC

(57) ABSTRACT

Control devices, methods, and programs set a final control value by smoothly shifting from the control value to a final control value. The devices, methods, and programs specify an operation amount of a user operation with respect to a prescribed control value, and access a pre-change control value that is a value of the control value before a completed change. Based on the accessed pre-change control value and the specified operation amount of the user operation, devices, methods, and programs set a final control value by changing the control value in a stepwise manner from the pre-change control value to the final control value within a prescribed control value range.

8 Claims, 11 Drawing Sheets

FIG. 5

| | SCALE | SCALE DISPLAY |
|---|---|---|
| ENLARGE ↑ | 1/5,000 | 50m |
| | 1/6,200 | 62m |
| | 1/7,500 | 75m |
| | 1/8,700 | 87m |
| | 1/10,000 | 100m |
| | 1/12,500 | 125m |
| | 1/15,000 | 150m |
| | 1/17,000 | 175m |
| | ... | ... |
| | 1/15,360,000 | 150km |
| | 1/17,920,000 | 175km |
| | 1/20,480,000 | 200km |
| | 1/25,600,000 | 250km |
| | 1/30,720,000 | 300km |
| | 1/35,840,000 | 350km |
| ↓ REDUCE | 1/40,960,000 | 400km |
| | 1/51,200,000 | 500km |

F I G . 12

| | SCALE | SCALE DISPLAY | |
|---|---|---|---|
| ENLARGE ↑ | 1/5,000 | 50m | |
| | 1/6,200 | 62m | |
| | 1/7,500 | 75m | |
| | 1/8,700 | 87m | |
| | 1/10,000 | 100m | |
| | 1/12,500 | 125m | |
| | 1/15,000 | 150m | |
| | 1/17,000 | 175m | |
| | ... | ... | |
| | 1/15,360,000 | 150km | |
| | 1/17,920,000 | 175km | |
| | 1/20,480,000 | 200km | CURRENT SCALE |
| | 1/25,600,000 | 250km | |
| | 1/30,720,000 | 300km | |
| | 1/35,840,000 | 350km | |
| ↓ REDUCE | 1/40,960,000 | 400km | TENTATIVE FINAL SCALE (FOR OPERATION AMOUNT OF 10) |
| | 1/51,200,000 | 500km | |
| | 1/61,440,000 | 600km | TENTATIVE FINAL SCALE (FOR OPERATION AMOUNT OF 14) |
| | 1/71,680,000 | 700km | |

DISPLAY DEVICE WITH STEPWISE DISPLAY SCALE CONTROL, STEPWISE CONTROL METHOD OF THE DISPLAY SCALE ON A DISPLAY DEVICE, AND COMPUTER PROGRAM FOR STEPWISE CONTROL OF THE DISPLAY SCALE OF A DISPLAY DEVICE

INCORPORATION BY REFERENCE

The disclosure of Japanese Patent Application No. 2010-260707, filed on Nov. 23, 2010, including the specification, drawings, and abstract is incorporated herein by reference in its entirety.

BACKGROUND

1. Related Technical Fields

Related technical fields include control devices, control methods of a control device, and computer programs which change various types of control values based on an operation of a user.

2. Related Art

Recently, navigation devices that perform vehicle travel guidance so that a driver can reach a desired destination easily are often installed in vehicles. Here, a navigation device is a device which is capable of detecting a current position of a host vehicle using a GPS receiver or the like, acquiring map data corresponding to the current position from a recording medium such as a DVD-ROM or an HDD, or through a network, and displaying the acquired map data on a liquid crystal monitor. The navigation device is also provided with a route search function that, when the desired destination is input, searches for an optimum route from the host vehicle position to the destination. The navigation device then displays the guidance route on a display screen and reliably guides the user to the desired destination by providing guidance by voice in situations such as when the host vehicle approaches an intersection. In recent years, mobile telephones, personal digital assistants (PDAs), personal computers and the like often have functions similar to the navigation device described above.

Here, in order to learn facilities located around the vehicle and the road shape through the navigation device and the like mentioned above, it is important that a scale (control value) of a map displayed on a display device is set to an appropriate scale. In view of this, Japanese Patent Application Publication No. JP-A-2000-163031 (page 6, FIGS. 6 to 8), for example, describes changing the scale of the map displayed on the display device based on a user operation. As an example, JP-A-2000-163031 describes a control that enlarges the scale of the map displayed on the display device based on two fingers spreading while touching a touch panel, and reducing the scale of the map displayed on the display device based on two fingers coming together while touching the touch panel.

SUMMARY

However, changing a control value based on a user operation as described in JP-A-2000-163031 (according to JP-A-2000-163031, changing the scale of the map displayed on the display device) is not limited to navigation devices and the like, and is performed by various types of control devices. Other examples include adjusting the volume of a music player, adjusting the temperature of a heated appliance, and adjusting the brightness of a lighting device. To change the control value, such control devices normally shift in stages from a current control value to a final control value instead of all at once. This stepwise shift is also preferably made as smooth as possible. However, there are cases where the control value cannot be smoothly shifted based on the operation amount of the user operation with the related art.

Exemplary implementations of the broad inventive principles described herein provide a control device, a control method of a control device, and a computer program which change a control value by smoothly shifting from the control value to a final control value without depending on an operation amount of a user operation.

Exemplary implementations provide an operation amount specification unit that specifies an operation amount of a user operation with respect to a prescribed control value; a final control value setting unit that sets a final control value that is the control value after a completed change, based on a pre-change control value that is the control value before the change and the operation amount of the user operation specified by the operation amount specification unit; and a control value changing unit that sets the control value by changing in a stepwise manner from the pre-change control value to the final control value within a prescribed control value range, in a number of stages that is based on a difference between the pre-change control value and the final control value. The final control value setting unit specifies a tentative final control value that is shifted from the pre-change control value by a shift amount that is based on the operation amount of the user operation specified by the operation amount specification unit, compares the tentative final control value and a limit value of the control value range, sets the limit value as the final control value if the tentative final control value exceeds the limit value of the control value range, and sets the tentative final control value as the final control value if the tentative final control value does not exceed the limit value of the control value range.

Note that the "control value" corresponds to, for example, the volume of a music player, the temperature of a heated appliance, the brightness of a lighting device, or the scale of a map in a navigation device.

The "pre-change control value" corresponds to the control value before the control value changing unit changes the control value (the control value at an initial stage).

According to exemplary implementations, the control value range may be a plurality of settable control values that includes an upper limit value and a lower limit value as the limit value, and the control value changing unit may set the control value by changing the control value to any one of the plurality of settable control values. In addition, the control device may further include: a control value quantity calculation unit that calculates a quantity of the settable control values included between the pre-change control value and the final control value, wherein the control value is changed in a stepwise manner in a greater number of stages in proportion to a greater quantity of the settable control values calculated by the control value quantity calculation unit.

Exemplary implementations provide a current control value quantity calculation unit that calculates a quantity of the settable control values included between a current control value and the final control value, wherein the control value changing unit repeatedly performs processing that changes the control value by a shift amount corresponding to a number that multiplies the quantity of settable control values calculated by the current control value quantity calculation unit by a prescribed percent to change the control value in a stepwise manner until the final control value is reached.

Note that the "current control value" corresponds to the control value at each stage when the control value changing unit changes the control value in a stepwise manner from the pre-change control value to the final control value.

Exemplary implementations provide a touch panel that is disposed in a display area of a display device and receives a touch operation from the user; and a touch coordinate detection unit that detects touch coordinates touched by the user in the touch panel, wherein the display area includes a control value changing area for changing the control value, and the operation amount specification unit specifies the operation amount of the user operation with respect to the control value changing area.

According to exemplary implementations, the operation amount specification unit may specify, if a touch-off event occurs after the touch coordinates move in a direction that changes the control value as the user touches the control value changing area, the operation amount of the user operation with respect to the control value changing area based on a shift speed of the touch coordinates immediately before the touch-off event.

Exemplary implementations provide a map display unit that displays a map at a set scale on the display device, wherein the control value is the scale of the map displayed on the display device by the map display unit.

Exemplary implementations provide a method including: specifying an operation amount of a user operation with respect to a prescribed control value; setting a final control value that is the control value after a completed change, based on a pre-change control value that is the control value before the change and the operation amount of the user operation specified at the operation amount specification step; and setting the control value by changing the control value in a stepwise manner from the pre-change control value to the final control value within a prescribed control value range, in a number of stages that is based on a difference between the pre-change control value and the final control value. At the final control value setting step, a tentative final control value is specified that is shifted from the pre-change control value by a shift amount that is based on the operation amount of the user operation specified at the operation amount specification step, the tentative final control value and a limit value of the control value range are compared, the limit value is set as the final control value if the tentative final control value exceeds the limit value of the control value range, and the tentative final control value is set as the final control value if the tentative final control value does not exceed the limit value of the control value range.

Exemplary implementations provide computer program installed in a computer and performs in a processor the functions of: specifying an operation amount of a user operation with respect to a prescribed control value; setting a final control value that is the control value after a completed change, based on a pre-change control value that is the control value before the change and the operation amount of the user operation specified by the operation amount specification function; and setting the control value by changing the control value in a stepwise manner from the pre-change control value to the final control value within a prescribed control value range, in a number of stages that is based on a difference between the pre-change control value and the final control value. The final control value setting function specifies a tentative final control value that is shifted from the pre-change control value by a shift amount that is based on the operation amount of the user operation specified by the operation amount specification function, compares the tentative final control value and a limit value of the control value range, sets the limit value as the final control value if the tentative final control value exceeds the limit value of the control value range, and sets the tentative final control value as the final control value if the tentative final control value does not exceed the limit value of the control value range.

According to exemplary implementations, if the control value set in the control device changes based on an operation of the user, the control value can be smoothly shifted and changed to the final control value without depending on the operation amount of the user operation.

According to exemplary implementations, even when greatly changing the control value, the control value can be smoothly shifted by changing the control value in stages instead of greatly shifting the control value all at once.

According to exemplary implementations, the control value can be changed in stages, and the control value can be shifted such that a shift amount of the control value at each stage gradually decreases with each passing stage. As a consequence, the control value can be smoothly shifted without arousing a sense of incongruity in the user regarding the shifting of the control value.

According to exemplary implementations, the control value is changed based on an operation in which the user touches a specific area of the touch panel. Therefore, the user can easily change from the pre-change control value to a desired control value with a simple operation. Accordingly, the operability of the control device can be improved.

According to exemplary implementations, when performing a flicking operation on the specific area of the touch panel, the shift amount of the control value is set based on the shift speed of the touch coordinates during the flicking operation. Therefore, the user can easily and reliably change from the pre-change control value to a desired control value with a flicking operation. Accordingly, the operability of the control device can be improved.

According to exemplary implementations, the control value can be applied to the scale of the map displayed on the display device in particular. Therefore, if the scale of the map displayed on the display device changes based on an operation of the user, the scale can be smoothly shifted and changed to a final scale without depending on the operation amount of the user operation.

According to exemplary implementations, if the control value set in the control device changes based on an operation of the user, the control value can be smoothly shifted and changed to the final control value without depending on the operation amount of the user operation.

According to exemplary implementations, if the control value set in the computer changes based on an operation of the user, the control value can be smoothly shifted and changed to the final control value without depending on the operation amount of the user operation.

BRIEF DESCRIPTION OF THE DRAWINGS

FIG. 5 is a diagram that shows an example of scale displays and settable scales that can be set by the navigation device;

FIG. 12 is a diagram that explains a specification process of a tentative final scale at step 18;

DETAILED DESCRIPTION OF THE EXAMPLE

Figure 1:
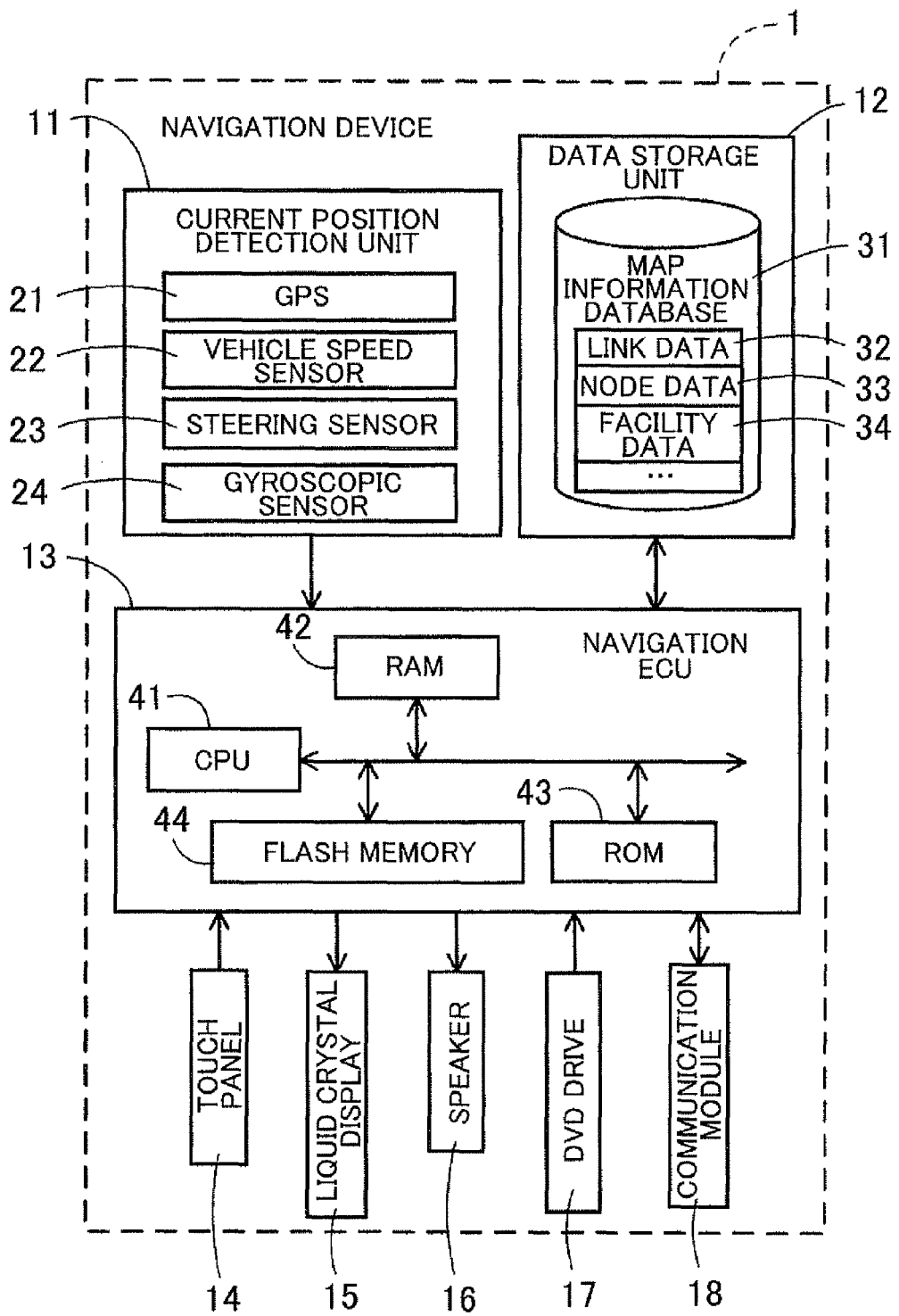
FIG. 1 is a block diagram that shows a navigation device according to an example.

A specific example of a control device that is realized in a navigation device will be described in detail below with reference to the drawings. First, an overall configuration of a navigation device 1 according to the present example will be explained using FIG. 1. FIG. 1 is a block diagram that shows the navigation device 1 according to the present example.

As shown in FIG. 1, the navigation device 1 according to the present example includes a current position detection unit 11 that detects a current position of a vehicle installed with the navigation device 1; a data storage unit 12 that stores various types of data; a navigation controller (e.g., ECU 13) that performs various types of computational processing based on input information; a touch panel 14 that receives an operation from a user; a liquid crystal display 15 that displays a map of the vehicle's surroundings for the user; a speaker 16 that outputs voice guidance pertaining to route guidance; a DVD drive 17 that reads a DVD serving as a storage medium; and a communication module 18 that performs communication with an information center such as a probe center or the VICS® (Vehicle lamination and Communication System) center.

Each of the configuring elements of the navigation device 1 will be explained in order below.

The current position detection unit 11 includes, for example, a GPS 21, a vehicle speed sensor 22, a steering sensor 23, and a gyroscopic sensor 24. The current position detection unit 11 is capable of detecting the vehicle's current position, heading, and running speed, as well as the current time and the like. The vehicle speed sensor 22, in particular, is a sensor for detecting the vehicle's speed and distance traveled. The vehicle speed sensor 22 generates a pulse in response to the rotation of the vehicle's drive wheels and outputs a pulse signal to the navigation ECU 13. The navigation ECU 13 counts the generated pulses to compute the revolution speed of the drive wheels and the distance traveled. Note that it is not necessary for the navigation device 1 to be provided with all of the five types of sensors described above, and it is acceptable for the navigation device 1 to be provided with only one or a plurality among the five types of sensors.

The data storage unit 12 includes a hard disk (not shown in the drawing) that serves as an external storage device and recording medium, and a read/write head (not shown in the drawing) that serves as a drive for reading a map information database 31, prescribed programs, and so on from the hard disk and writing prescribed data to the hard disk. Instead of a hard disk, the data storage unit 12 may also be configured from an optical disk such as a memory card, a CD, or a DVD.

Here, the map information database 31 is a storage unit that stores, for example, link data 32 pertaining to roads (links), node data 33 pertaining to node points, facility data 34 pertaining to facilities, map display data for displaying a map, intersection data pertaining to intersections, search data for finding routes, and search data for finding points.

Figure 2:
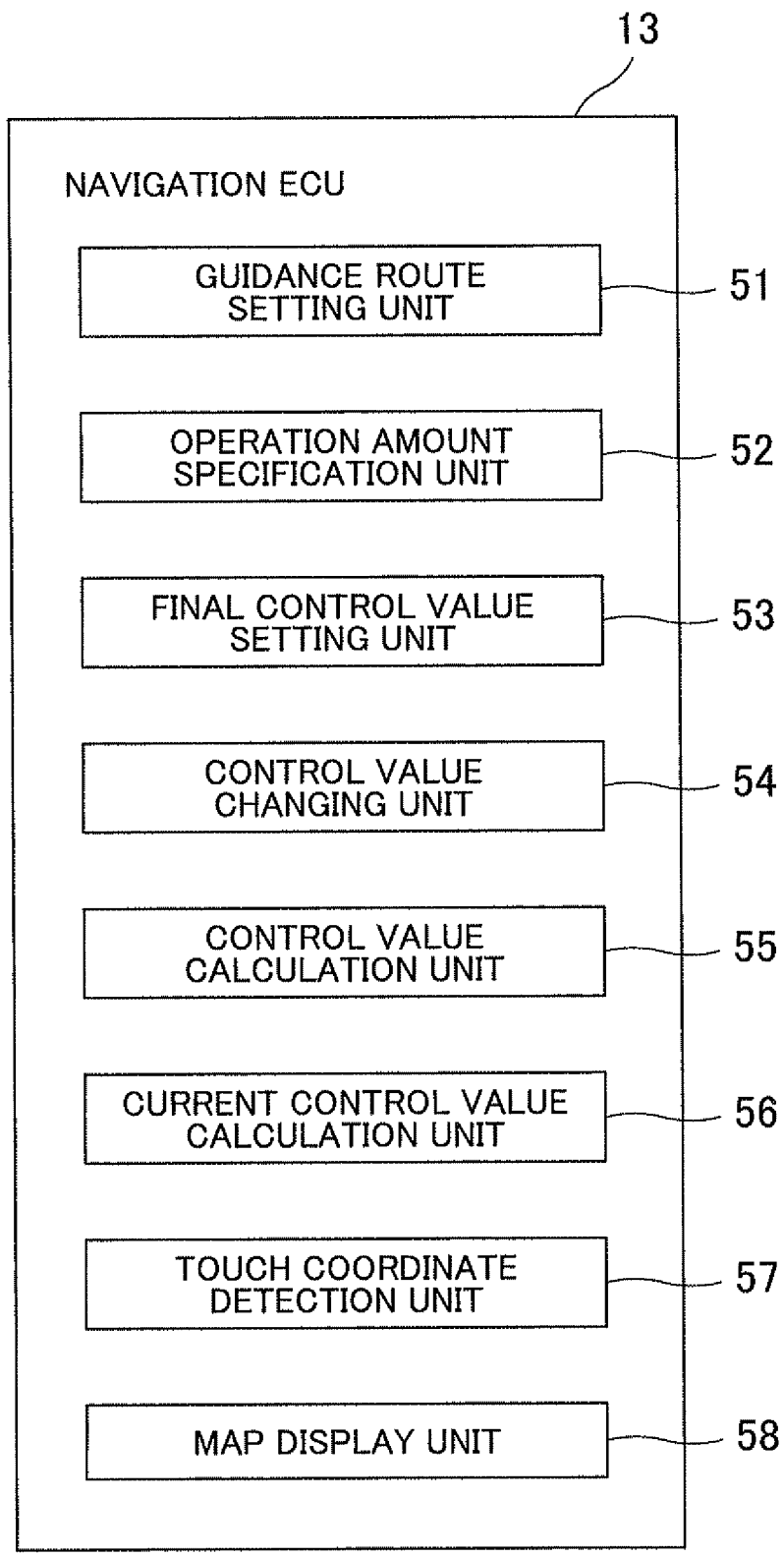
FIG. 2 is a drawing that shows various units configured by a navigation ECU.

The navigation ECU 13 is an electronic control unit that performs an overall control of the navigation device 1. The navigation ECU 13 includes a CPU 41 that serves as a computational device and a control device; a RAM 42 that is used as a working memory when the CPU 41 performs various types of computational processing, and also stores route data and the like when a route is found; a ROM 43 that stores control programs as well as a touch coordinate acquisition processing program described later (see FIG. 6) and a map image scale change processing program (see FIGS. 8 and 9); and an internal storage device such as a flash memory 44 that stores programs read from the ROM 43. Note that the navigation ECU 13 configures various units shown in FIG. 2 that act as processing algorithms. For example, a guidance route setting unit 51 sets a guidance route from a departure point to a destination. An operation amount specification unit 52 specifies an operation amount of a user operation with respect to a prescribed control value. A final control value setting unit 53 sets a final control value, which is a control value after a completed change, based on a control value before the change (e.g., a scale of the map displayed on the liquid crystal display 15) and the operation amount of the user operation specified by the operation amount specification unit 52. A control value changing unit 54 sets a control value by changing the control value in a stepwise manner from a pre-change control value, which is a control value before a change, to the final control value within a prescribed control value range in a number of stages that is based on a difference between the pre-change control value and the final control value. A control value quantity calculation unit 55 calculates a number of settable control values included between the pre-change control value and the final control value. A current control value quantity calculation unit 56 calculates a number of settable control values included between a current control value and the final control value. A touch coordinate detection unit 57 detects touch coordinates touched by the user on the touch panel 14, and a map display unit 58 displays a map at a set scale on a display device.

The touch panel 14 is disposed on a front surface of the display area of the liquid crystal display 15. The touch panel 14 is operated to scroll a map image, select a button disposed in the display area, and the like. In the navigation device 1 according to the present example, in particular, the touch panel 14 is also operated to change the scale of the map image displayed on the liquid crystal display 15. Based on a detection signal output from the touch panel 14 due to the user operating the touch panel 14, the navigation ECU 13 detects a "touch-on" event, i.e., a transition from a state in which the user is not touching the touch panel 14 to a state in which the user is touching the touch panel 14, and a "touch-off" event, i.e., a transition from a state in which the user is touching the touch panel 14 to a state in which the user is not touching the touch panel 14. The navigation ECU 13 also detects touch coordinates that are the coordinates of a point touched by the user, as well as a shift in the touch coordinates when an operation (i.e., a dragging operation or a flicking operation) is received to move a touched position while selecting a selection target, such as a map image, an enlarged view of an intersection, a button, and the like. The navigation ECU 13 performs a control to execute various types of operations corresponding to the detected touch operations, touch coordinates, and the like.

The liquid crystal display 15 displays a map image that includes roads, traffic information, operation guidance, an operation menu, key guidance, a guidance route from the current position to the destination, guidance information along the guidance route, news, a weather forecast, the time, e-mail, a television program, and the like. When displaying the map image on the liquid crystal display 15, a scale changing pad is superposed on part of an area of the map image. The scale changing pad is an operation portion for changing the scale (control value) of the map displayed on the liquid crystal display 15. If a prescribed operation is performed by the user on the scale changing pad as described later, the scale of the map displayed on the liquid crystal display 15 is changed. Here, FIG. 3 is a diagram that shows an example of a travel guidance screen 60 displayed on the liquid crystal display 15 during vehicle travel.

Figure 3:
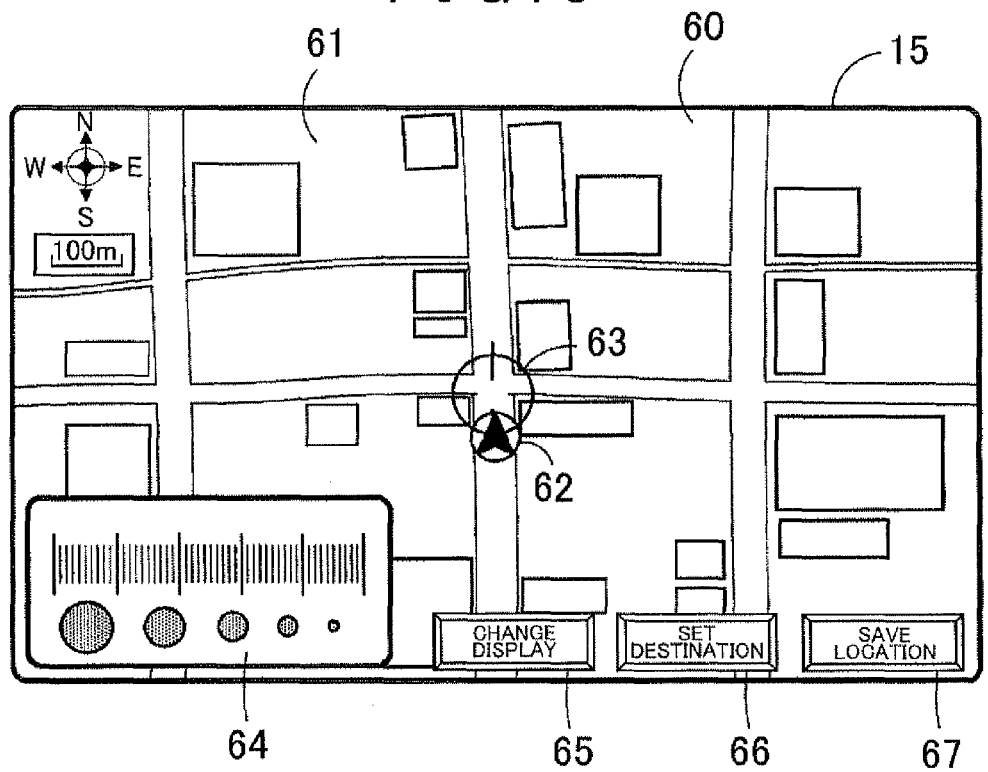
FIG. 3 is a diagram that shows an example of a travel guidance screen displayed on a liquid crystal display during vehicle travel.

As shown in FIG. 3, the travel guidance screen 60 displayed on the liquid crystal display 15 displays the following: a map image 61 around the current position of the vehicle; a host vehicle position marker 62 that indicates the current position of the vehicle matched to the map; a center cursor 63 that specifies the center position of the map display area; a scale changing pad 64 that acts as a control value changing area; and various buttons 65 to 67 for selecting prescribed functions to be executed by the navigation device 1. Note that FIG. 3 shows the travel guidance screen 60 with a map displayed at a scale of $1/10,000$. By referring to the travel guidance screen 60, the user can learn facilities currently around the vehicle and road shapes (including that of the guidance route if a guidance route is set). If the user performs a flicking operation or a dragging operation on the scale changing pad 64, as described later, the scale of the map can be changed in a stepwise manner to a larger scale (e.g., a scale of $1/5,000$) or a smaller scale (e.g., a scale of $1/80,000$). By touching on and selecting the Change Display button 65, the user can change a display mode (e.g., bird's eye view, plane view, nose-up view, and north-up view) of the map image 61. By touching on and selecting the Set Destination button 66, the user can set a point indicating the center cursor 63 as the destination. By touching on and selecting the Save Location button 67, the user can save a point indicating the center cursor 63 to the navigation device 1 as a saved location.

Figure 4:
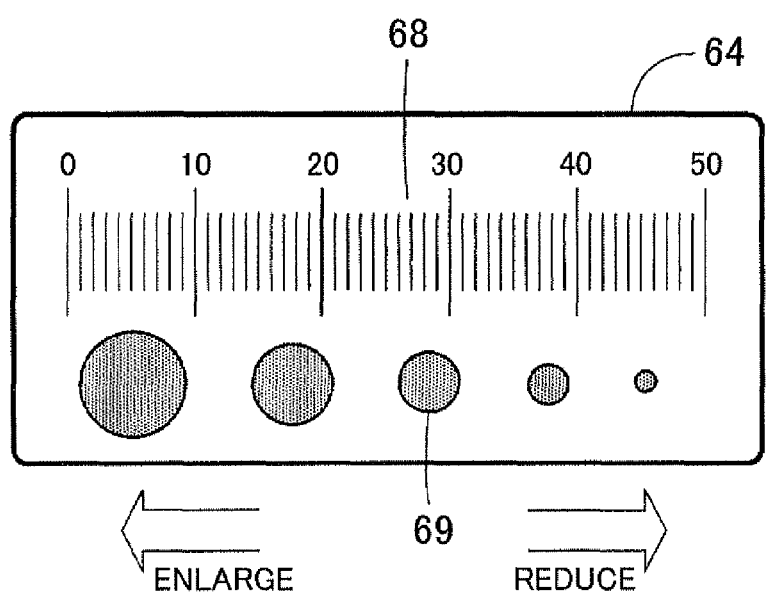
FIG. 4 is an enlarged view of a scale changing pad displayed on the travel guidance screen.

Next, the scale changing pad 64 will be described in more detail using FIG. 4. FIG. 4 is an enlarged view of the scale changing pad 64 displayed on the travel guidance screen 60.

As shown in FIG. 4, the scale changing pad 64 has an elongated shape, and displays a memory portion 68 that is marked in the left-right direction with a memory ranging from "0" to "50" (e.g., one memory unit equals one millimeter). By performing a flicking operation or a dragging operation in the left or right direction within the scale changing pad 64, the user can change the scale of the map image 61. In addition, circular marks 69 of different sizes are arranged in a row within the scale changing pad 64. The leftward circular marks 69 enlarge the scale of the map image 61, that is, the left direction corresponds to a direction that changes the map image 61 to a more detailed map. The rightward circular marks 69 reduce the scale of the map image 61, that is, the right direction corresponds to a direction that changes the map image 61 to a wider area map. Thus, the user performs a flicking operation or a dragging operation in the left direction to enlarge the scale of the currently displayed map image 61. Meanwhile, the user performs a flicking operation or a dragging operation in the right direction to reduce the scale of the currently displayed map image 61. A change mode of the scale (the scale after a completed change, or the number of stages of change until a change is completed) is set for the flicking operation based on a shift speed of the touch coordinates immediately before a touch-off event is detected as described later, and set for the dragging operation based on a shift amount of the touch coordinates after a touch-on event is detected until a touch-off event is detected.

A changeable scale range (control value range) of the map image 61 displayed on the liquid crystal display 15 is $1/5,000$ to $1/1,200,000$ in the present example. There are 50 settable scales (settable control values) including a lower limit value of $1/1,200,000$ and an upper limit value of $1/5,000$. FIG. 5 is a diagram that shows an example of scale displays and settable scales that can be set by the navigation device 1. As shown in FIG. 5, for example, the scale of $1/5,000$ that is the largest settable scale corresponds to a scale display of 50 meters, and the scale of $1/1,200,000$ that is the smallest settable scale corresponds to a scale display of 500 kilometers. The navigation device 1 displays the scale of the map image 61 displayed on the liquid crystal display 15 as set to any one of the 50 settable scales shown in FIG. 5. If an operation to change the scale is received from the user, the navigation device 1 changes and sets the scale to any one of the 50 settable scales based on the current scale and the operation amount of the user operation as described later. Note that the number of settable scales is not limited to 50, and there may be 100 or 20 settable scales, for example.

The speaker 16 outputs traffic information guidance and voice guidance for guiding travel along the guidance route on the basis of an instruction from the navigation ECU 13. In addition, the speaker 16 is also used to output information pertaining to facilities found in a facility search.

The DVD drive 17 is a drive capable of reading data stored on a recording medium such as a DVD or a CD. Music and videos are played, and the map information database 31 is updated and the like based on the data that is read.

The communication module 18 is a communication device, such as a mobile telephone or a DCM, for example, that receives traffic information that is transmitted from a traffic information center, such as the VICS center, a probe center, or the like. The traffic infatuation includes various types of information, such as congestion information, restriction information, and traffic accident information.

Figures 6, 7:
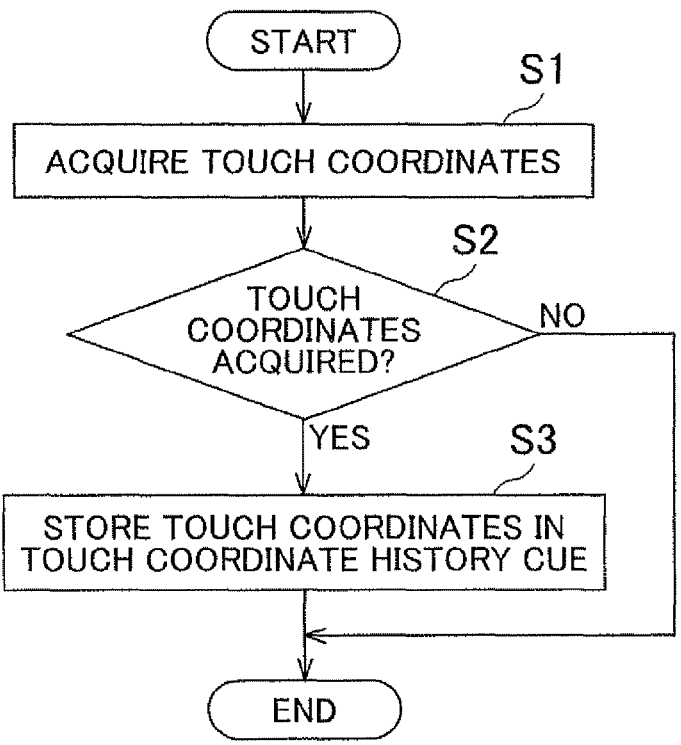
FIG. 6 is a flowchart of a touch coordinate acquisition processing algorithm according to the example.
FIG. 7 is a schematic diagram of a touch coordinate history cue.
Figure 8:
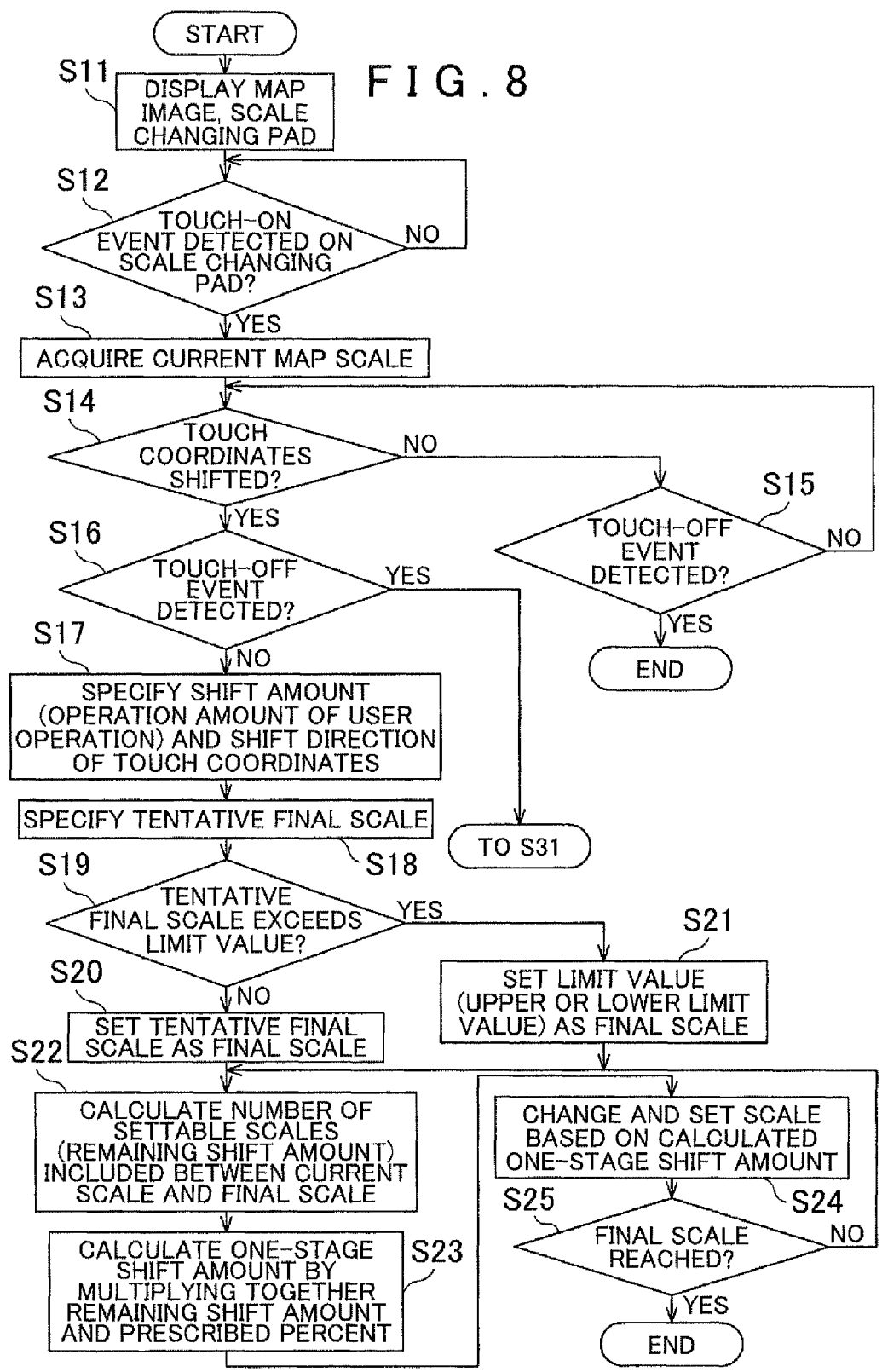
FIG. 8 is a flowchart of a map image scale change processing algorithm according to the example.
Figure 9:
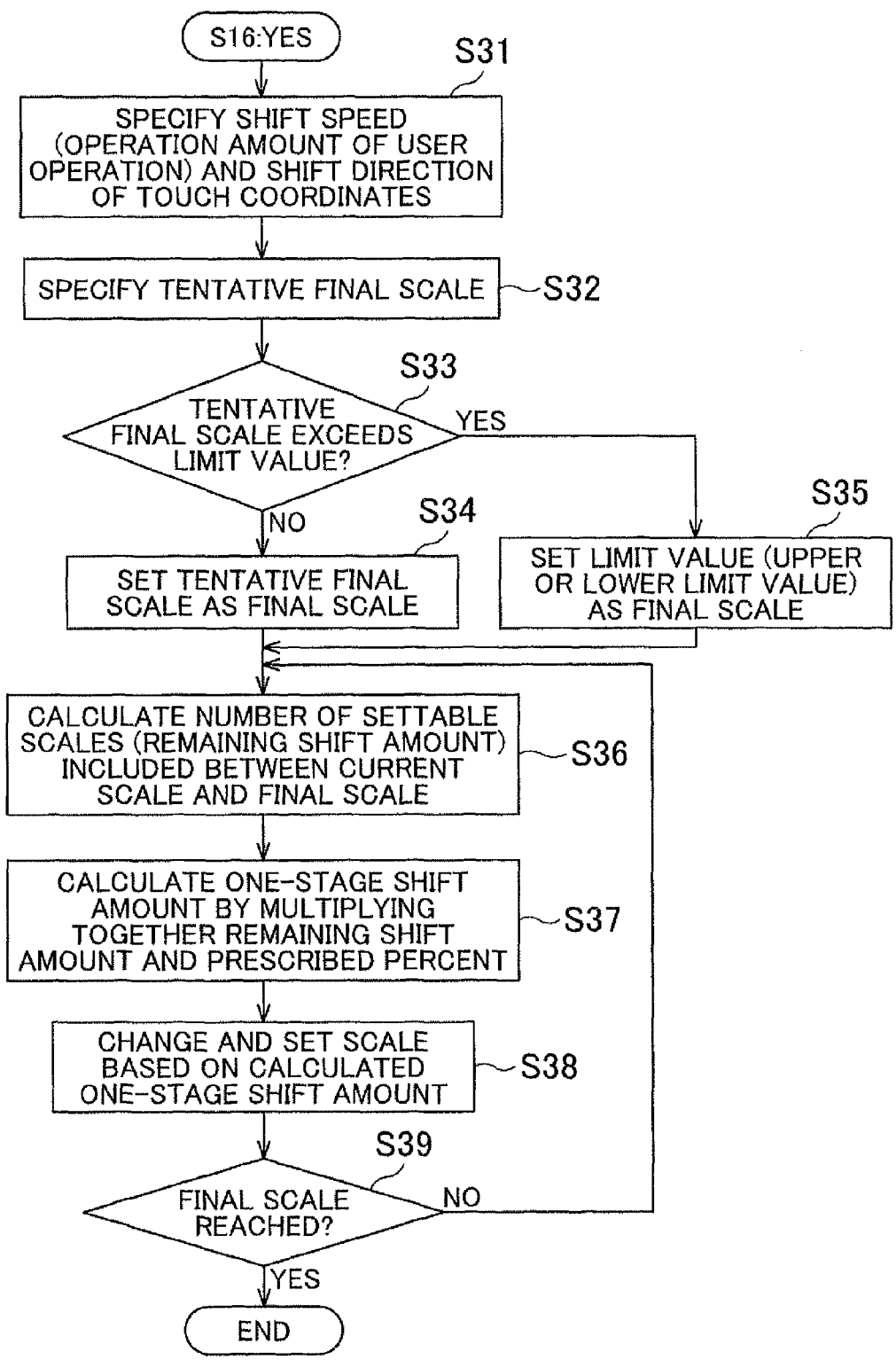
FIG. 9 is a flowchart of the map image scale change processing algorithm according to the example.

Next, the touch coordinate acquisition processing method will be described with reference to the algorithms shown in FIGS. 6, 8, and 9. The exemplary method may be implemented, for example, by one or more components of the above-described navigation device 1. For example, the method may be implemented in the farm of a computer program stored in the RAM 42 and/or ROM 43 and executed by the CPU 41. However, even though the exemplary structure of the above-described navigation device 1 may be referenced in the description, it should be appreciated that the structure is exemplary and the exemplary method need not be limited by any of the above-described exemplary structure.

Here, the touch coordinate acquisition processing program is repeatedly executed at a prescribed interval (e.g., every 200 milliseconds) once the vehicle power is turned on, and when the user is touching the touch panel 14 acquires touch coordinates that are the coordinates of the touched point.

In the touch coordinate acquisition processing program, first, the CPU 41 acquires touch coordinates that are the coordinates of a point the user is touching on the touch panel 14 based on a detection signal transmitted from the touch panel 14 at step (hereinafter abbreviated as "S") 1. For example, if the touch panel 14 is based on a resistive or capacitance system, the touch coordinates are detected by detecting a position of a flowing current based on a change in pressure or capacitance at the point touched by the user.

Next, at S2, the CPU 41 determines whether touch coordinates were acquired through the processing at S1. Note that touch coordinates are acquired at S1 when the user is touching the touch panel 14 (in the resistive system in particular, when the user is touching the touch panel 14 using a pressure equal to or greater than a prescribed value).

If it is determined that touch coordinates were acquired through the processing at S1 (S2: Yes), the CPU 41 proceeds to S3. However, if it is determined that touch coordinates were not acquired through the processing at S1 (S2: No), the touch coordinate acquisition processing program is ended without storing touch coordinates.

Next, at S3, the CPU 41 stores the touch coordinates acquired through the processing at S1 in a touch coordinate history cue provided in the RAM 42. The touch coordinate history cue is configured so as to store a prescribed number (e.g., four) of immediately prior acquisitions of touch coordinate data. FIG. 7 is a schematic diagram of the touch coordinate history cue. As four immediately prior acquisitions of touch coordinate data, as shown in FIG. 7, the data of touch coordinates A, B, C, and D are stored in the touch coordinate history cue in the order of oldest data first. If touch coordinates E are newly acquired, the data of the touch coordinates A acquired at the oldest timing are deleted, and the data of the touch coordinates E are newly stored in the touch coordinate history cue. In addition, the touch coordinate history cue is reset if a touch-off event is established, or if a selection target is newly selected based on a touch-on event. The touch coordinate acquisition processing program is then ended.

Based on the touch coordinates stored in the touch coordinate history cue at S3, the CPU 41 executes various types of processing. For example, the CPU 41 performs selection processing for the various buttons 65 to 67 displayed on the liquid crystal display 15, scroll processing for the map image 61, and map scale change processing (FIGS. 8 and 9) described later for changing the scale of the map image 61.

Next, the map image scale change processing program that is executed by the navigation ECU 13 in the navigation device 1 will be explained based on FIGS. 8 and 9. FIGS. 8 and 9 are flowcharts of the map image scale change processing program according to the present example. Here, the map image scale change processing program is executed after the vehicle power is turned on. The map image scale change processing program displays the map image of the vehicle's surroundings on the liquid crystal display 15, and changes the scale of the map image displayed on the liquid crystal display 15 from the current scale based on a received user operation. Note that the program shown in the flowcharts of FIGS. 8 and 9 is stored in the RAM 42 and the ROM 43 that are provided in the navigation device 1 and is executed by the CPU 41.

In the map image scale change processing program, first, at S11, the CPU 41 displays the travel guidance screen 60 (FIG. 3) that includes the map image 61 of the vehicle's surroundings and the scale changing pad 64 on the liquid crystal display 15. Note that, when the power is first turned on, the scale of the map image 61 displayed on the liquid crystal display 15 is set to a scale based on an initial setting (e.g., 1/80,000) or a scale that was set when the power was previously turned off.

Figure 10:
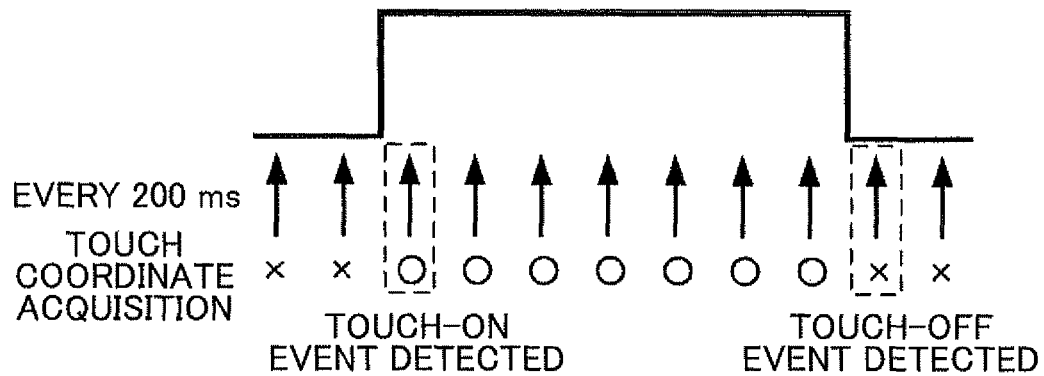
FIG. 10 is a diagram that shows a mode of detecting a touch-on event and a touch-off event.

Next, at S12, based on a detection signal transmitted from the touch panel 14, the CPU 41 determines whether a touch-on event is detected in the scale changing pad 64, i.e., whether there is a transition from a state in which the user is not touching an area that corresponds to the scale changing pad 64 of the touch panel 14 to a state in which the user is touching the area. Specifically, as shown in FIG. 10, in the touch coordinate acquisition processing program (FIG. 6) described earlier that is executed at the prescribed interval, a touch-on event is detected in the scale changing pad 64 if touch coordinates could not be acquired in the previous processing but touch coordinates could be acquired in the current processing in the area that corresponds to the scale changing pad 64 of the touch panel 14.

If it is determined that a touch-on event is detected in the scale changing pad 64 (S12: Yes), the CPU 41 proceeds to S13. However, if it is determined that a touch-on event is not detected in the scale changing pad 64 (S12: No), the CPU 41 stands by until a touch-on event is detected.

At S13, the CPU 41 acquires the scale of the map currently set by the navigation device 1 (that is, the scale of the map image 61 currently displayed on the liquid crystal display 15). Note that the scale of the map currently set by the navigation device 1 is stored in the RAM 42 or the like.

Then, at S14, the CPU 41 determines whether the touch coordinates shifted by comparing the four immediately prior acquisitions of touch coordinates stored in the touch coordinate history cue. Specifically, the CPU 41 determines that the touch coordinates shifted if none of the four immediately prior acquisitions of touch coordinates are within a prescribed error range (e.g., ±5%). However, the CPU 41 determines that the touch coordinates did not shift if all of the four immediately prior acquisitions of touch coordinates are within the prescribed error range. Here, shifting of the touch coordinates corresponds to the user performing a dragging, flicking, or other operation.

If it is determined that the touch coordinates shifted (S14: Yes), the CPU 41 proceeds to S16. However, if it is determined that the touch coordinates did not shift (S14: No), the CPU 41 proceeds to S15.

At 515, based on a detection signal transmitted from the touch panel 14, the CPU 41 determines whether a touch-off event is detected, i.e., whether there is a transition from a state in which the user is touching the touch panel 14 to a state in which the user is not touching the touch panel 14. Specifically, as shown in FIG. 10, in the touch coordinate acquisition processing program (FIG. 6) described earlier that is executed at the prescribed interval, a touch-off event is detected when touch coordinates could be acquired in the previous processing but touch coordinates could not be acquired in the current processing.

If it is determined that a touch-off event is detected (S15: Yes), the map image scale change processing program is ended. However, if it is determined that a touch-off event is not detected (S15: No), the CPU 41 returns to S14.

At S16, which is executed if it is determined at S14 that the touch coordinates shifted (S14: Yes), the CPU 41 determines whether a touch-off event is detected.

If it is determined that a touch-off event is detected (S16: Yes), the CPU 41 determines that a flicking operation was performed on the scale changing pad 64 and proceeds to S31 (FIG. 9). However, if it is determined that a touch-off event is not detected (S16: No), the CPU 41 determines that a dragging operation was performed on the scale changing pad 64 and proceeds to S17.

Figure 11:
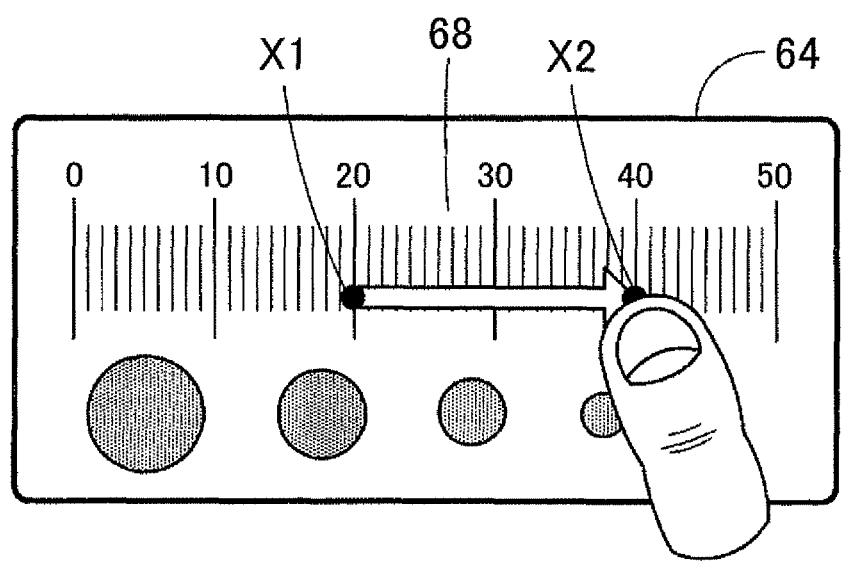
FIG. 11 is a diagram that explains a dragging operation performed on the scale changing pad.

At S17, the CPU 41 specifies a shift amount of the touch coordinates during the dragging operation performed on the scale changing pad 64 as an operation amount of a user operation. Specifically, the operation amount of the user operation is the shift amount from the touch coordinates of a start point where the dragging operation started to the current touch coordinates. The shift amount of the touch coordinates is also specified based on a memory quantity of the memory portion 68 displayed in the scale changing pad 64. For example, as shown in FIG. 11, the user performs a dragging operation from X1 acting as a start point to X2, which shifts the touch coordinates from "20" to "40" of the memory portion 68. Therefore, the shift amount of the touch coordinates (the operation amount of the user operation) specified at S17 is "20," that is, the difference between "20" and "40." In addition, at S17, a shift direction of the touch coordinates during the dragging operation is specified as a scale changing direction. The scale changing direction is specified as either an enlarging direction or a reducing direction. In the present example, the scale changing direction is specified as the enlarging direction if the touch coordinates shift to the left, and the scale changing direction is specified as the reducing direction if the touch coordinates shift to the right.

Next, at S18, the CPU 41 specifies a tentative final scale based on the scale of the map currently set by the navigation device 1, as well as the operation amount of the user operation and the scale changing direction specified at S17.

Specifically, first, the CPU 41 calculates a tentative scale shift amount as a value that multiplies the operation amount of the user operation calculated at S17 by 0.5. The CPU 41 then specifies the tentative final scale as the scale found after changing the scale of the map currently set by the navigation device 1 by the number of levels of the calculated tentative scale shift amount in the specified scale changing direction. As an example, the scale of the map currently set by the navigation device 1 is $1/20,480,000$, the operation amount of the user operation specified at S17 is "10," and the scale changing direction is specified as the reducing direction. In such case, the tentative scale shift amount corresponds to "5." Thus, as shown in FIG. 12, the tentative final scale is $1/51,200,000$, which is the scale found after moving five levels in the reducing direction from the current scale of $1/20,480,000$ (i.e., the settable scale after moving five levels toward the reducing side from $1/20,480,000$). If the operation amount of the user operation specified at S17 is "14" and the scale changing direction is specified as the reducing direction, the tentative scale shift amount corresponds to "7." Thus, as shown in FIG. 12, the tentative final scale is $1/71,680,000$, which is the scale after moving seven levels in the reducing direction from the current scale of $1/20,480,000$. Note that the scale of $1/71,680,000$ is lower than the lower limit value ($1/51,200,000$) of the settable scales which are scales that can be set by the navigation device 1.

Next, at S19, the CPU 41 determines whether the tentative final scale specified at S17 exceeds one of the limit values of the settable scales (FIG. 5) which are scales that can be set by the navigation device 1. In the present example, the settable scales range is from $1/5,000$ to $1/51,200,000$ as shown in FIG. 5, wherein the lower limit value is $1/51,200,000$ and the upper limit value is $1/5,000$.

If it is determined that the tentative final scale specified at S18 does not exceed either of the limit values of the settable scales (FIG. 5) which are scales that can be set by the navigation device 1 (S19: No), the CPU 41 sets the tentative final scale specified at S18 as the final scale, which is the scale (control value) after a completed change (S20). However, if it is determined that the tentative final scale specified at S17 exceeds one of the limit values of the settable scales (FIG. 5) which are scales that can be set by the navigation device 1 (S19: Yes), the CPU 41 sets that particular limit value (the upper limit value of $1/5,000$ if the tentative final scale is greater than the upper limit value, and the lower limit value of $1/51,200,000$ if the tentative final scale is less than the lower limit value) as the final scale (S21). The CPU 41 then proceeds to S22.

Next, at S22, the CPU 41 calculates a number of settable scales (hereinafter referred to as a "remaining shift amount") included between the scale of the map currently set by the navigation device 1 and the final scale set at S20. For example, if the current scale is $1/20,480,000$ and the final scale is $1/51,200,000$, the remaining shift amount corresponds to "5."

At S23, the CPU 41 then calculates a "one-stage shift amount" as a value that multiplies the remaining shift amount calculated at S22 by a prescribed percent. Specifically, the one-stage shift amount is set to a value found after rounding the value that multiplies the remaining shift amount by 0.25 to the nearest whole number (however, if less than one, the product is rounded up). For example, if the current scale is $1/20,480,000$ and the final scale is $1/51,200,000$, the one-stage shift amount is 5'0.25>>"1."

Next, at S24, the CPU 41 changes and sets the scale set in the navigation device 1 based on the one-stage shift amount calculated at S23. Specifically, the CPU 41 changes to a scale found after moving from the scale currently set in the navigation device 1 by the one-stage shift amount in the scale changing direction specified at S17. For example, if the current scale is $1/20,480,000$, the scale changing direction is specified as the reducing direction, and the one-stage shift amount is "2," the scale is changed to $1/30,720,000$, which is two levels toward the reducing side from the scale of $1/20,480,000$.

At S25, the CPU 41 determines whether the scale currently set in the navigation device 1 corresponds to the final scale.

If it is determined that the scale currently set in the navigation device 1 corresponds to the final scale (S25: Yes), the map image scale change processing program is ended. However, if it is determined that the scale currently set in the navigation device 1 does not correspond to the final scale (S25: No), the CPU 41 returns to S22. The processing at S22 to S24 is then repeatedly executed until the scale currently set in the navigation device 1 reaches the final scale.

An example will be explained using FIG. 13. In this case, the scale before performing a scale change is set to $1/5,120,000$. If an operation to change the scale is received from the user and the scale changing direction is specified as the reducing direction, the final scale is set to $1/51,200,000$ based on the operation amount of the user operation.

Figure 13:
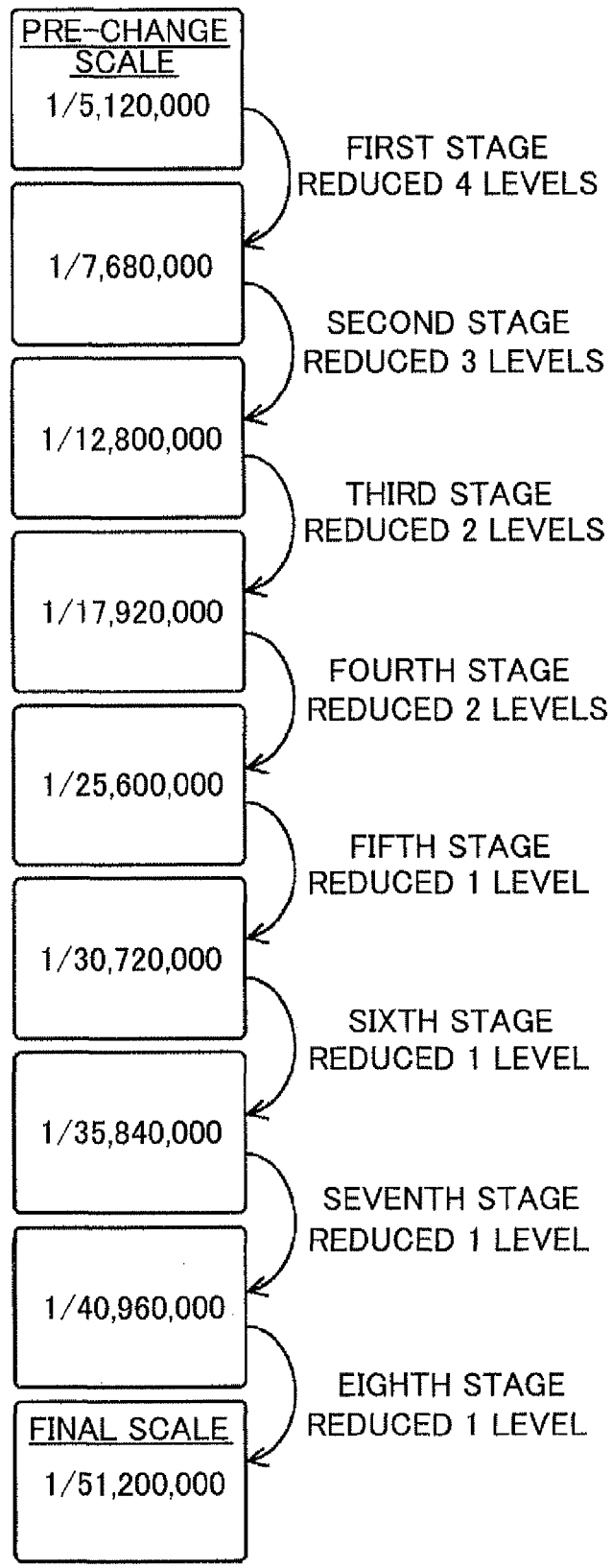
FIG. 13 is a diagram that explains a scale change process at steps 22 to 25.

As shown in FIG. 13, first, at S22, the calculated remaining shift amount corresponds to "15." Thus, the one-stage shift amount calculated at S23 is 15'0.25>>"4." According to a first stage variation, the scale is changed to the settable scale four levels toward the reducing side, which consequently changes the scale from $1/5,120,000$ to $1/7,680,000$.

Next, at S22, the calculated remaining shift amount corresponds to "11." Thus, the one-stage shift amount calculated at S23 is 11'0.25>>"3." According to a second stage variation, the scale is changed to the settable scale three levels toward the reducing side, which consequently changes the scale from $1/7,680,000$ to $1/12,800,000$.

Next, at S22, the calculated remaining shift amount corresponds to "8." Thus, the one-stage shift amount calculated at S23 is 8'0.25>>"2." According to a third stage variation, the scale is changed to the settable scale two levels toward the reducing side, which consequently changes the scale from $1/12,800,000$ to $1/17,920,000$.

Next, at S22, the calculated remaining shift amount corresponds to "6." Thus, the one-stage shift amount calculated at S23 is 6'0.25>>"2." According to a fourth stage variation, the scale is changed to the settable scale two levels toward the reducing side, which consequently changes the scale from $1/17,920,000$ to $1/25,600,000$.

Next, at S22, the calculated remaining shift amount corresponds to "4." Thus, the one-stage shift amount calculated at S23 is 4'0.25>>"1." According to a fifth stage variation, the scale is changed to the settable scale one level toward the reducing side, which consequently changes the scale from $\frac{1}{25,600,000}$ to $\frac{1}{30,720,000}$.

Thereafter, from a sixth stage to an eighth stage, the scale is changed by one level toward the reducing side in each stage, and the scale change is completed when the final scale of $\frac{1}{51,200,000}$ is reached.

As described above, according to the present example, if a dragging operation to change the scale is received from the user, the scale of the map set in the navigation device 1 is set by changing in a stepwise manner from the pre-change scale to the final scale within a range of settable scales, in the number of stages that is based on the difference between the pre-change scale and the final scale. Specifically, processing is repeatedly executed that changes the scale by a shift amount that corresponds to a number found by multiplying the number of settable scales included between the current scale and the final scale by the prescribed percent. Thus, a greater number of scales included between the pre-change scale and the final scale results in a stepwise change using a greater number of stages. In the present example, if the tentative final scale exceeds the range of settable scales, the exceeded limit value (the upper limit value of $\frac{1}{5,000}$ if the tentative final scale is greater than the upper limit value, and the lower limit value of $\frac{1}{51,200,000}$ if the tentative final scale is less than the lower limit value) is set as the final scale (S21). Therefore, compared to changing the scale with the tentative final scale that exceeds one of the limit values set as the final scale, the change process can be performed in a greater number of stages to achieve a smooth scale change.

Meanwhile, if it is determined in the processing at S16 that a touch-off event is detected (S16: Yes), the CPU 41 determines that a flicking operation was performed on the scale changing pad 64 and proceeds to S31.

Figure 14:
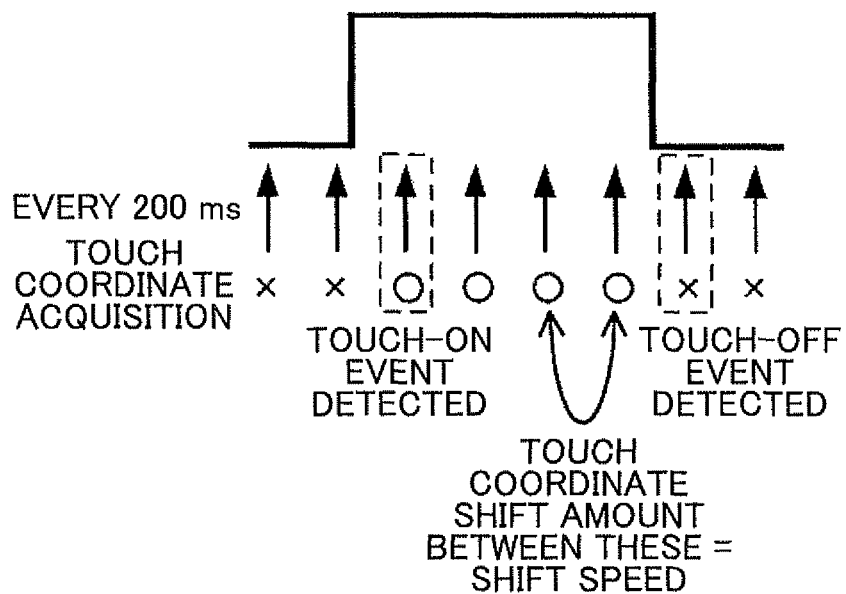
FIG. 14 is a diagram that explains a method of calculating an operation amount of a user operation during a flicking operation.
Figure 15:
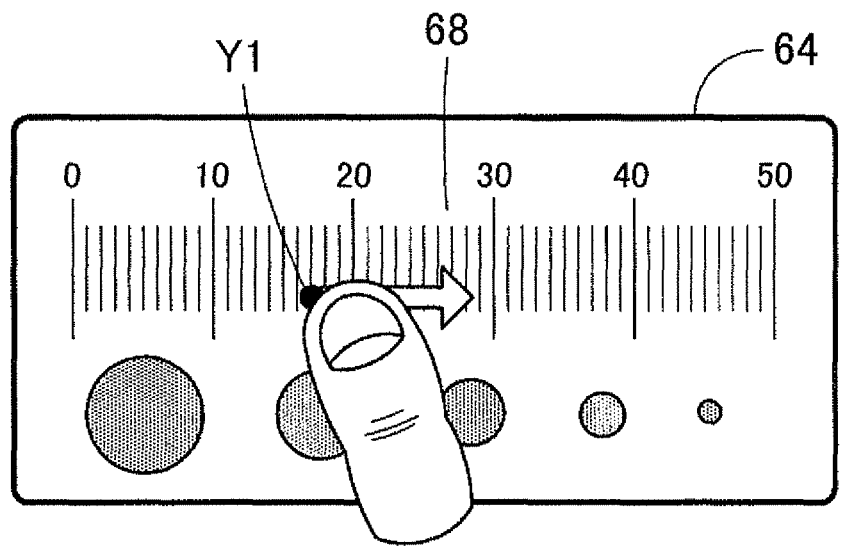
FIG. 15 is a diagram that explains the flicking operation performed on the scale changing pad.

At S31, the CPU 41 specifies a shift speed of the touch coordinates during the flicking operation performed on the scale changing pad 64 immediately prior to the touch-off event as the operation amount of the user operation. Specifically, as shown in FIG. 14, the shift amount (mm) between the previous touch coordinates acquired immediately prior to the detection of the touch-off event and the next-to-previous touch coordinates detected before that is equal to a shift amount of the touch coordinates every 200 milliseconds (mm/200 ms), and calculated as the shift speed of the touch coordinates immediately prior to the touch-off event. In addition, at S31, the scale changing direction is specified as either the enlarging direction or the reducing direction based on the shift direction of the touch coordinates. As shown in FIG. 15, if the flicking operation is performed rightward from Y1 acting as a start point, the shift direction of the touch coordinates during the flicking operation is specified as the scale changing direction.

Next, at S32, the CPU 41 specifies the tentative final scale based on the scale of the map currently set by the navigation device 1, as well as the operation amount of the user operation and the scale changing direction specified at S31.

Specifically, first, the CPU 41 calculates the tentative scale shift amount as a value that multiplies the operation amount (mm/200 ms) of the user operation calculated at S32 by 5. The CPU 41 then specifies the tentative final scale as the scale found after changing the scale of the map currently set by the navigation device 1 by the number of stages of the calculated tentative scale shift amount in the specified scale changing direction.

The subsequent processing at S33 to S39 is identical to the processing at S19 to S25 and will not be explained further here. In the navigation device 1 according to the present example, if a flicking operation to change the scale is received from the user, similar to when the dragging operation described above is received, the scale of the map set in the navigation device 1 is set by changing in a stepwise manner from the pre-change scale to the final scale within the range of settable scales, in the number of stages that is based on the difference between the pre-change scale and the final scale. Specifically, processing is repeatedly executed that changes the scale by the shift amount that corresponds to the number found by multiplying the number of settable scales included between the current scale and the final scale by the prescribed percent. Thus, a greater number of scales included between the pre-change scale and the final scale results in a stepwise change using a greater number of stages. In the present example, if the tentative final scale exceeds the range of settable scales, the exceeded limit value (the upper limit value of $\frac{1}{5,000}$ if the tentative final scale is greater than the upper limit value, and the lower limit value of $\frac{1}{51,200,000}$ if the tentative final scale is less than the lower limit value) is set as the final scale (S35). Therefore, compared to changing the scale with the tentative final scale that exceeds one of the limit values set as the final scale, the change process can be performed in a greater number of stages to achieve a smooth scale change. That is, if the tentative final scale that exceeds one of the limit values is set as the final scale, the shift amount of the scale at each stage is set using the final scale that exceeds that particular limit value as a reference. Thus, the shift amount at each stage (especially the shift amount at the initial stage) increases such that the scale reaches that particular limit value after changing in a few stages.

As described in detail above, in the navigation device 1 according to the present example, the control method of the navigation device 1, and the computer program executed by the navigation device 1, the map image of the vehicle's surroundings is displayed at a prescribed scale on the liquid crystal display 15 (S11). When an operation to change the scale that the user performs using the scale changing pad 64 is received, the operation amount of the user operation is specified (S17, S31). Next, the tentative final scale is specified, which is shifted from the current scale by the shift amount that is based on the operation amount of the user operation (S18, S32), and the specified tentative final scale and the limit values of the range of settable scales in the navigation device 1 are compared (S19, S33). If the tentative final scale exceeds one of the limit values of the range of settable scales in the navigation device 1, that particular limit value is set as the final scale (S21, S35). If the tentative final scale does not exceed the range of settable scales in the navigation device 1, the tentative final scale is set as the final scale (S20, S34). The scale is set by changing in a stepwise manner from the pre-change scale to the final scale within the range of settable scales, in the number of stages that is based on the difference between the pre-change scale and the final scale (S22 to S24, S36 to S38). Therefore, the scale of the navigation device 1 can be smoothly shifted and changed to the final scale independent of the operation amount of the user operation.

When changing the scale of the map set in the navigation device 1, processing is repeatedly executed that changes the scale by the shift amount that corresponds to the number found by multiplying the number of settable scales included between the current scale and the final scale by the prescribed percent, so as to change the scale in a stepwise manner to the final scale (S22 to S24, S36 to S38). Therefore, the scale can be shifted in stages, and also shifted such that the shift amount of the scale at each stage gradually decreases with each passing stage. As a consequence, the scale can be smoothly shifted without arousing a sense of incongruity in the user regarding the shifting of the scale.

A greater number of settable scales included between the pre-change scale and the final scale results in a stepwise change using a greater number of stages. Therefore, even when greatly changing the scale, the scale is shifted in a stepwise manner instead of being greatly shifted all at once. Consequently, the scale can be smoothly shifted.

In addition, the scale is changed based on an operation in which the user touches the scale changing pad 64 provided in a specific area of the touch panel 14. Therefore, the user can easily change from the current scale to a desired scale with a simple operation. In particular, when performing a flicking operation on the scale changing pad 64, the shift amount of the scale is set based on the shift speed of the touch coordinates during the flicking operation. Therefore, the user can easily and reliably change from the current scale to a desired scale with a flicking operation. Accordingly, the operability of the navigation device 1 can be improved.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

For example, the coefficient to be multiplied when calculating the tentative scale shift amount at S18 and S32, and the coefficient to be multiplied when calculating the one-stage shift amount at S23 and S37 may be modified as appropriate.

The present example is configured such that an operation amount of a user operation is specified based on a dragging operation or a flicking operation received on the scale changing pad 64 provided on a display screen. However, the operation amount of the user operation may be specified based on the dragging operation or the flicking operation received on a pad provided at a location other than on the display screen (e.g., on a console box of the vehicle or a connected communication terminal). Also, the operation amount of the user operation may be specified based on another operation (e.g., a dial operation or a numerical input operation).

In the present example, as an example, the control value is applied to the scale of the map displayed on the liquid crystal display 15 of the navigation device 1. However, the control value may be applied to a device other than the navigation device 1 with a map display function, including a personal computer and a portable device such as a mobile telephone. The applicability of the control value is also not limited to the scale of a map. For example, the control value may be applied to the volume of a music player, the temperature of a heated appliance, and the brightness of a lighting device.

What is claimed is:

1. A control device, comprising:
   a memory that stores:
      a pre-change scale; and
      a computer-executable scale change program;
   a display device that displays a map; and
   a processor that, when executing the stored scale change program:
      specifies an operation amount of a user operation that changes a scale of the displayed map;
      accesses the stored pre-change scale that is a scale of the displayed map before the user operation; and
      based on the accessed pre-change scale and the specified operation amount of the user operation, sets a final scale that is a value of the scale after the user operation by
         changing the scale of the displayed map in a stepwise manner from the pre-change scale to the final scale within a prescribed scale range, a number of steps of the stepwise change being based on a difference between the pre-change scale and the final scale, the final scale being set by:
      specifying a tentative final scale that is shifted from the pre-change scale by a shift amount that is based on the specified operation amount of the user;
      comparing the tentative final scale and a scale limit, the scale limit comprising at least one of an upper limit and a lower limit;
      setting the final scale equal to the scale limit when the tentative final scale exceeds the scale limit; and
      setting the final scale equal to the tentative final scale when the tentative final scale does not exceed the scale limit;
      identifying a plurality of settable scales between the upper limit and the lower limit;
      calculating a number of the settable scales included between the pre-change scale and the final scale, the number of steps being set in proportion to the calculated number of the settable scales;
      while changing the scale, calculating a number of the settable scales included between a current scale and the final scale; and
      repeatedly changing the scale by a shift amount corresponding to a number that multiplies the number of settable scales included between a current scale and the final scale by a prescribed percent to change the scale in a stepwise manner until the final scale is reached.

2. The control device according to claim 1, further comprising:
   a touch panel that is disposed in a display area of the display device and receives a touch operation from the user, the display area including a scale changing area for changing the scale;
   wherein the controller:
      detects touch coordinates touched by the user in the touch panel; and
      specifies the operation amount of the user operation with respect to the scale changing area.

3. The control device according to claim 2, wherein the controller:
   when a touch-off event occurs after the touch coordinates move in a direction that changes the scale, specifies the operation amount of the user operation with respect to the scale changing area based on a shift speed of the touch coordinates immediately before the touch-off event.

4. A navigation device comprising the control device according to claim 1.

5. A control method of a control device, comprising:
   displaying a map on a display device;
   specifying, with a processor, an operation amount of a user operation that changes a scale of the displayed map;
   accessing, with the processor, a pre-change scale that is a scale of the displayed map before the user operation; and
   based on the accessed pre-change scale and the specified operation amount of the user operation, setting, with the processor, a final scale that is a value of the scale after the user operation, the by changing, with the processor, the scale in a stepwise manner from the pre-change scale to the final scale within a prescribed scale range, a number of steps of the stepwise change being based on a difference between the pre-change scale and the final scale, the final scale being set by:

specifying, with the processor, a tentative final scale that is shifted from the pre-change scale by a shift amount that is based on the specified operation amount of the user;

comparing, with the processor, the tentative final scale and a scale limit, the scale limit comprising at least one of an upper limit and a lower limit;

setting, with the processor, the final scale equal to the scale limit when the tentative final scale exceeds the scale limit;

setting, with the processor, the final scale equal to the tentative final scale when the tentative final scale does not exceed the scale limit;

identifying, with the processor, a plurality of settable scales between the upper limit and the lower limit;

calculating, with the processor, a number of the settable scales included between the pre-change scale and the final scale, the number of steps being set in proportion to the calculated number of the settable scales;

while changing the scale, calculating, with the processor, a number of the settable scales included between a current scale and the final scale; and repeatedly changing, with the processor, the scale by a shift amount corresponding to a number that multiplies the number of settable scales included between a current scale and the final scale by a prescribed percent to change the scale in a stepwise manner until the final scale is reached.

6. The control method according to claim 5, further comprising:

providing a touch panel that is disposed in a display area of the display device and receives a touch operation from the user, the display area including a scale changing area for changing the scale;

detecting, with the processor, touch coordinates touched by the user in the touch panel; and specifying, with the processor, the operation amount of the user operation with respect to the scale changing area.

7. The control method according to claim 6, further comprising:

when a touch-off event occurs after the touch coordinates move in a direction that changes the scale, specifying, with the processor, the operation amount of the user operation with respect to the scale changing area based on a shift speed of the touch coordinates immediately before the touch-off event.

8. A non-transitory computer-readable storage medium storing a computer-executable control program, the program comprising:

instructions for displaying a map on a display device;

instructions for specifying an operation amount of a user operation that changes a scale of the displayed map;

instructions for accessing a pre-change scale that is a scale of the displayed map before the user operation; and instructions for, based on the accessed pre-change scale and the specified operation amount of the user operation, setting a final scale that is a value of the scale after the user operation by changing the scale in a stepwise manner from the pre-change scale to the final scale within a prescribed scale range, a number of steps of the stepwise change being based on a difference between the pre-change scale and the final scale, the final scale being set by:

specifying a tentative final scale that is shifted from the pre-change scale by a shift amount that is based on the specified operation amount of the user;

comparing the tentative final scale and a scale limit, the scale limit comprising at least one of an upper limit and a lower limit;

setting the final scale equal to the scale limit when the tentative final scale exceeds the scale limit;

setting the final scale equal to the tentative final scale when the tentative final control scale does not exceed the scale limit;

identifying a plurality of settable scales between the upper limit and the lower limit;

calculating a number of the settable scales included between the pre-change scale and the final scale the number of steps being set in proportion to the calculated number of the settable scales;

while changing the scale, calculating a number of the settable scales included between a current scale and the final scale; and repeatedly changing the scale by a shift amount corresponding to a number that multiplies the number of settable scales included between a current scale and the final scale by a prescribed percent to change the scale in a stepwise manner until the final scale is reached.

* * * * *